(12) United States Patent
Belstrup et al.

(10) Patent No.: US 11,731,097 B2
(45) Date of Patent: Aug. 22, 2023

(54) CATALYST PARTICLE SHAPE

(71) Applicant: HALDOR TOPSØE A/S, Kgs. Lyngby (DK)

(72) Inventors: Moritz Bo Belstrup, Taastrup (DK); Peter Rahbek, Taastrup (DK); Martin Østberg, Tune (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 17/292,125

(22) PCT Filed: Nov. 19, 2019

(86) PCT No.: PCT/EP2019/081780
§ 371 (c)(1),
(2) Date: May 7, 2021

(87) PCT Pub. No.: WO2020/120078
PCT Pub. Date: Jun. 18, 2020

(65) Prior Publication Data
US 2022/0032253 A1    Feb. 3, 2022

(30) Foreign Application Priority Data

Dec. 12, 2018  (DK) .......................... PA 2018 00993

(51) Int. Cl.
*B01J 8/06*  (2006.01)
*B01J 19/30*  (2006.01)
*B01J 35/02*  (2006.01)

(52) U.S. Cl.
CPC .............. *B01J 8/062* (2013.01); *B01J 8/067* (2013.01); *B01J 19/30* (2013.01); *B01J 35/026* (2013.01);
(Continued)

(58) Field of Classification Search
CPC ... B01J 19/30; B01J 8/062; B01J 8/067; B01J 35/026; B01J 2219/30211;
(Continued)

(56) References Cited

U.S. PATENT DOCUMENTS

| | | |
|---|---|---|
| 3,911,070 A | 10/1975 | Lundsager |
| 4,441,990 A | 4/1984 | Huang |

(Continued)

FOREIGN PATENT DOCUMENTS

| | | |
|---|---|---|
| DE | 3539195 A1 | 5/1986 |
| EP | 0206535 A1 | 12/1986 |

(Continued)

OTHER PUBLICATIONS

Danish Search Report issued in corresponding Patent Application No. PA 2018 00993 dated Sep. 9, 2019.
(Continued)

*Primary Examiner* — Lessanework Seifu
(74) *Attorney, Agent, or Firm* — Boone IP Law

(57) ABSTRACT

A catalytic system is provided which comprises a tubular reactor and at least one catalyst particle located within the tubular reactor. The catalyst particles have a particular geometric form which promotes heat transfer with the tubular reactor. Certain specific catalyst particles are also provided.

13 Claims, 7 Drawing Sheets

(52) U.S. Cl.
CPC .......... *B01J 2219/3023* (2013.01); *B01J 2219/30211* (2013.01); *B01J 2219/30223* (2013.01); *B01J 2219/30475* (2013.01); *B01J 2219/32425* (2013.01); *B01J 2219/32483* (2013.01)

(58) Field of Classification Search
CPC ...... B01J 2219/3023; B01J 2219/30475; B01J 2219/32425; B01J 2219/32483; B01J 2219/30296; B01J 2219/30416; B01J 2219/312; B01J 2219/3183
See application file for complete search history.

(56) References Cited

U.S. PATENT DOCUMENTS

| | | | |
|---|---|---|---|
| 4,606,815 A | 8/1986 | Gibson | |
| 5,371,277 A | 12/1994 | Matsumoto et al. | |
| 7,246,795 B2 | 7/2007 | Niknafs et al. | |
| 8,062,521 B2 * | 11/2011 | Glover | B01D 39/2068 502/527.19 |
| 10,112,830 B2 * | 10/2018 | Wang | B01J 37/0201 |
| 2008/0277315 A1 | 11/2008 | Ringer et al. | |
| 2011/0166013 A1 | 7/2011 | Cairns et al. | |
| 2016/0279587 A1 | 9/2016 | Shimasaki | |
| 2017/0361312 A1 | 12/2017 | Leal et al. | |
| 2018/0117578 A1 | 5/2018 | Coupland et al. | |
| 2018/0327259 A1 | 11/2018 | Alexander et al. | |

FOREIGN PATENT DOCUMENTS

| | | |
|---|---|---|
| EP | 0593646 A1 | 4/1994 |
| EP | 0678331 A1 | 10/1995 |
| EP | 2323762 A1 | 5/2011 |
| EP | 2342014 A1 | 7/2011 |
| EP | 2716363 A1 | 4/2014 |
| WO | 2004014549 A1 | 2/2004 |

OTHER PUBLICATIONS

International Search Report (PCT/ISA/210) and Written Opinion (PCT/ISA/237) dated Jan. 31, 2020, by the European Patent Office as the International Searching Authority for International Application No. PCT/EP2019/081780.

* cited by examiner

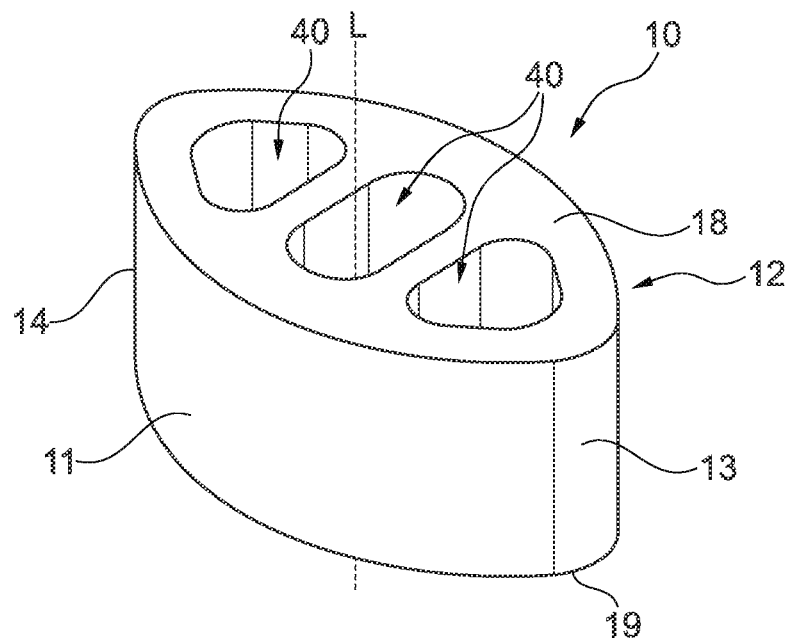
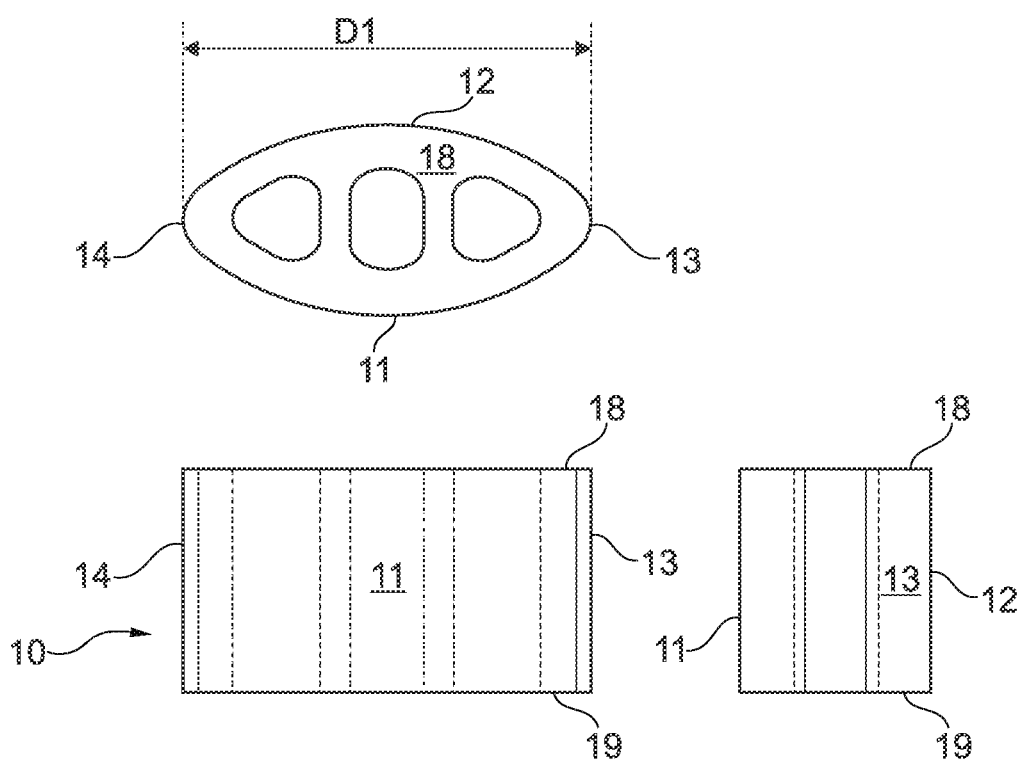
Fig. 1
Fig. 2

US 11,731,097 B2

CATALYST PARTICLE SHAPE

TECHNICAL FIELD

A catalytic system is provided which comprises a tubular reactor and at least one catalyst particle located within the tubular reactor. The catalyst particles have a particular geometric form which promotes heat transfer with the tubular reactor. Certain specific catalyst particles are also provided.

BACKGROUND

Tubular reactors containing catalytic particles are used for many industrial chemical processes, including steam reforming. Key parameters in efficient functioning of such tubular reactors include e.g. the packing of the catalytic particles in the reactor, the efficacy of material transfer through the reactor and heat transfer from the tubular reactor surface to the catalyst particles in a process with an endothermic reaction, such as steam reforming and heat transfer from the catalyst particles to the tubular reactor surface in a process with an exothermic reaction, such as methanol synthesis or selective oxidations.

The present technology relates to catalytic reactors, where heat transfer is an essential part determining the overall performance as seen for strongly endothermic reactions or exothermic reactions. By their very nature, the product of these reactions are maximized at high temperature for endothermic reactions and at low temperatures for exothermic reactions meaning that effective heat transfer is critical for the overall process performance Certain technologies (e.g. WO2004/014549) have focused on improving the efficacy of chemical processes by using a particular ratio between diameter and height of catalytic particles. Other technologies e.g. US7799730 have included grooves in the catalyst body, while other technologies (e.g. US3911070) describe certain materials suitable for the extrusion process.

Additionally, catalyst particles are often manufactured via extrusion. This gives them a substantially constant cross-sectional form along their length and substantially flat end surfaces. However, the presence of flat surfaces can allow catalyst particles to pack closely, and potentially block gas flow at said flat surfaces; especially if said flat end surfaces contain gas channels.

Another potential problem experienced for tubular reactors containing catalytic particles is that the catalyst particles can form "bridges" across the internal space in the tubular reactor, from one internal surface to another. This phenomenon can cause poor packing of reactors when such reactors are filled with particles. In reactors with multiple parallel tubular reactors, it can also lead to uneven flow distribution among the reactors and thereby seriously affect the overall performance. The present technology aims to address the above-mentioned problems.

SUMMARY

It has been found that a particular relationship between the form of catalytic particles, and the form of the tubular reactor can improve heat transfer from said reactor. The present technology therefore relates to a catalytic system comprising a tubular reactor and at least one catalyst particle, as per the enclosed set of claims.

Additionally, catalytic particles having a novel form are provided, as per the enclosed set of claims.

BRIEF DESCRIPTION OF THE DRAWINGS

FIG. 1 illustrates a catalyst particle according to a first embodiment of the invention FIG. 2 is a third-angle projection (Multiview) of the particle of FIG. 1, with views of an end-face, first sidewall and third sidewall.

DETAILED DISCLOSURE

Definitions

As used when referring to the various end-faces or sidewalls herein, the term "opposing" is used to define two end-faces or sidewalls which are located on opposite ends of a line extending from one of said end-faces or sidewalls through the centre of the particle to the "opposing" end-face or sidewall, in a plane defined perpendicular to the primary axis L.

Figure 12:
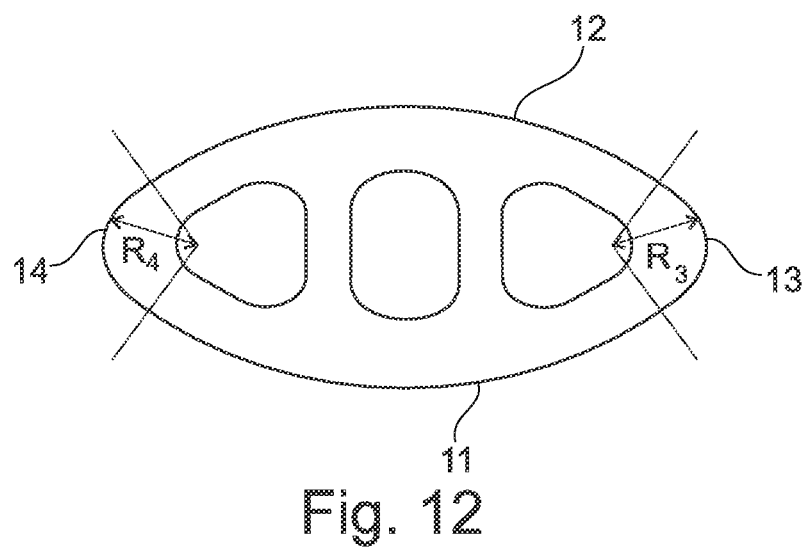
FIGS. 12 and 13 are expanded views of a cross-section of the particle of the first embodiment, showing how the radius of curvature R1, R2, R3 and R4 are determined.
Figure 13:
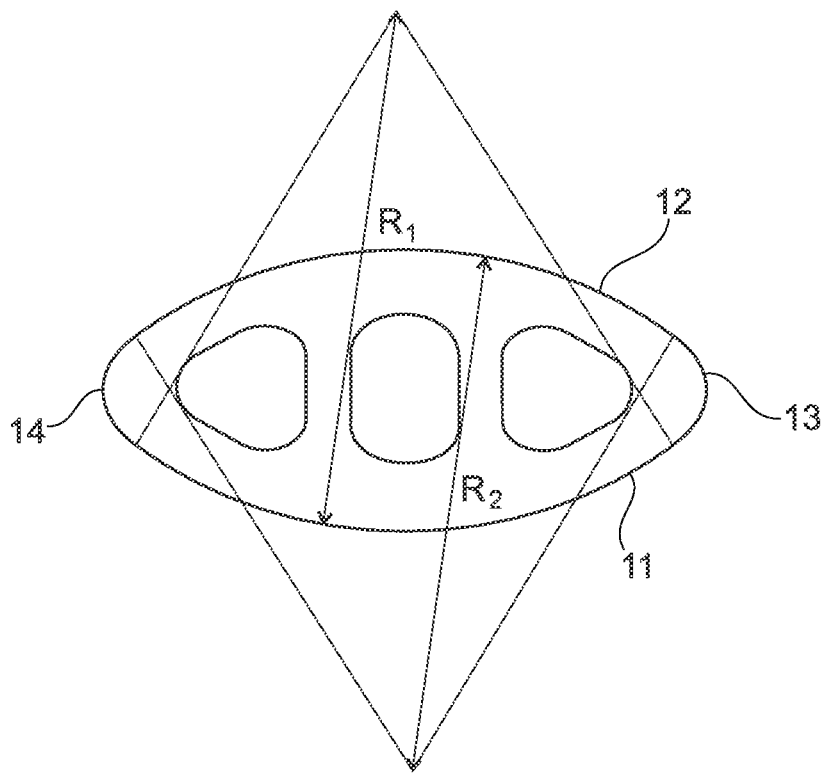

When a surface or element of the present technology has a particular "radius of curvature", this is defined as being the radius of a circle that best fits a normal section thereof. A radius of curvature in the present case is used to mean that said surface or element has a regular circular profile, at least across a portion thereof. FIGS. 12 and 13 illustrate how radius of curvature can be determined.

Catalytic System

In a first embodiment, a catalytic system 100 is provided. The catalytic system 100 is suitably a steam reformer, but can be other systems having a tubular reactor and catalyst particles, in which heat transfer between the reactor and particles is important. Heat transfer can take place from the tubular reactor to the catalyst particles, or vice-versa.

Figure 9:
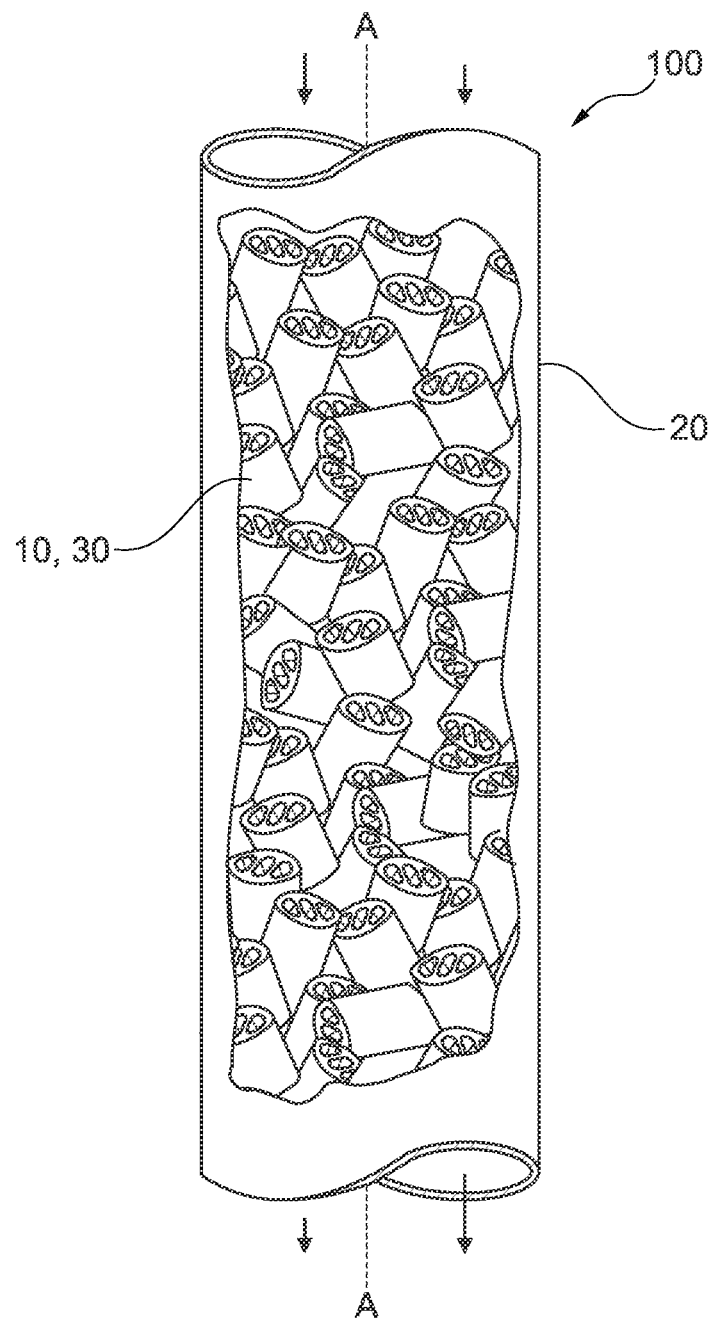
FIG. 9 illustrates the catalytic system of the invention, in which catalyst particles are located in a tubular reactor

The catalytic system comprises a tubular reactor 20, illustrated generally in FIG. 9. The tubular reactor has a cylindrical form around an axis A-A; and is made of a suitable metal or metal alloy. In that the tubular reactor 20 has a "cylindrical form", it has a constant, circular cross section along a substantial part of its length, centred around axis A-A.

Figure 10:
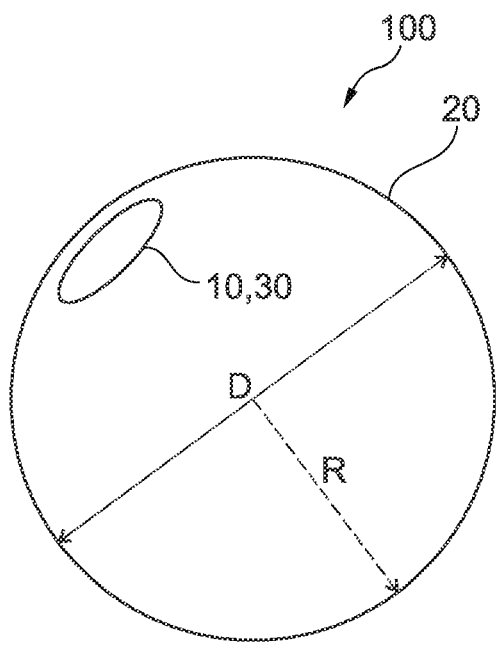
FIG. 10 is a schematic cross-section of the tubular reactor of FIG. 9, taken perpendicular to the axis A-A, showing the relationship between a catalyst particle and the inner surface of the tubular reactor.
Figure 11:
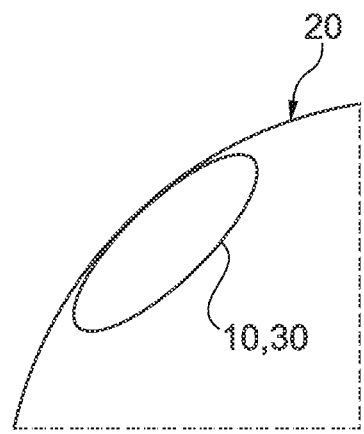
FIG. 11 is an expanded view of a part of FIG. 10, showing a catalyst particle located against the inner surface of the tubular reactor.

The tubular reactor 20 in the present technology has a length dimension along axis A-A, and an internal diameter D and an internal radius of curvature R, defined in a plane perpendicular to the axis A-A. Typically, the length dimension of the reactor is between 3 and 15 m, preferably between 10 and 13 m. Typically, the internal diameter D is between 5 and 25 cm, preferably between 7.5 and 15 cm, while the radius of curvature is ½×D. D and R are illustrated in FIG. 10.

There are typically multiple tubular reactors placed either in a fired furnace for endothermic reactions or in a cooled vessel for exothermic reactions. The cooling media in the cooled vessel could be vaporizing water, small fluidized inert particles, molten salts or liquid oils with high boiling points. The fired furnace is heated by fuel or process off-gas combusted with an oxidant typically air using multiple burners.

The tubular reactor 20 is fitted with one or more inlets and one or more outlets for gas. In a particular embodiment, the tubular reactor 20 is a steam methane reformer.

At least one catalyst particle 10 is located in the tubular reactor 20. In typical circumstances, between 100 and 100000, preferably between 500 and 60000 catalyst particles 10 are located in the tubular reactor. Packing of the tubular reactor 20 with catalyst particles is illustrated in FIG. 9.

Catalyst particles may be comprised entirely of catalytic material; alternatively, catalyst particles may comprise a support material upon which catalytic material is coated, impregnated or otherwise incorporated. The catalyst particle may be porous, in which case it may have a porosity between 20% and 65% preferably between 40% and 55%.

Suitable catalytic materials for the present technology include aluminates, calcium aluminates, magnesium aluminates, ceria, zirconia, and combinations there off with nickel, cobalt, ruthenium, palladium, rhodium, platinum or combination there off as active metal using promoters such as lanthanum, titanium, potassium, cesium. The catalyst particles may be extruded, but are preferably moulded or 3D printed.

In a first aspect of this embodiment, each catalyst particle 10 has a three-dimensional form with a primary length axis L. Each catalyst particle 10 has at least one plane of symmetry which includes the primary length axis L. Preferably each catalyst particle 10 has two perpendicular planes of symmetry which intersect at the primary length axis L.

Typically, the length of the catalyst particle 10 in the length axis L is between 6 and 50 mm, preferably between 11 and 25 mm.

Each catalyst particle 10 comprises a first end-face 18 and a second end-face 19. As shown in FIGS. 1-4, these end-faces 18, 19 define the limits of the catalyst particle 10 in the direction of the primary length axis L. End-faces 18, 19 are arranged perpendicular to said primary axis L at least in the region in which they meet said primary axis L.

In one embodiment, shown in FIGS. 1-2, end-faces 18, 19 are planar. This embodiment has the advantage that it can be readily manufactured.

In another embodiment, at least one of said first end-face 18 and said second end-face 19 of said catalyst particle 10, has a convex form so as to define curved first and second end-faces 18', 19' of said catalyst particle 10. The number of flat (planar) surfaces is thus reduced, which—in turn—reduces the potential for adjacent catalyst particles to block gas flow at said flat surfaces.

Figure 3:
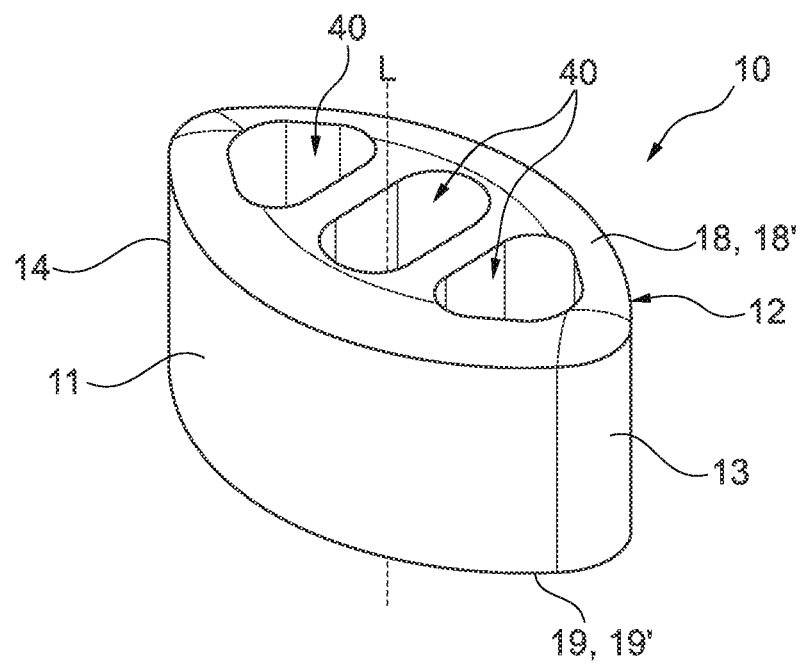
FIG. 3 illustrates the catalyst particle according to the first embodiment of the invention, having convex end faces
Figure 4:
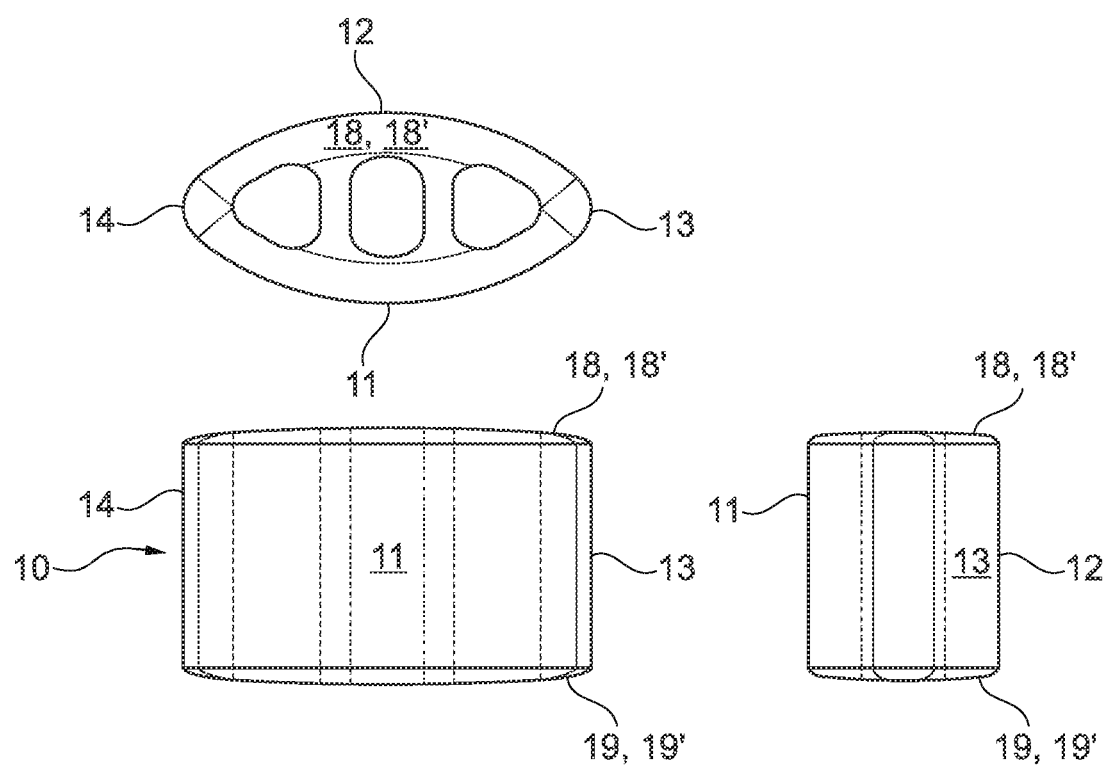
FIG. 4 is a third-angle projection (Multiview) of the particle of FIG. 3, with views of an end-face, first sidewall and third sidewall.

Preferably, both first end-face 18 and said second end-face 19 have a convex form, as per the embodiment shown in FIGS. 3-4.

Each catalyst particle 10 in this aspect of the invention comprises first 11 and second 12 sidewalls extending between the first and second end-faces 18, 19. Suitably, the first 11 and second 12 sidewalls are opposing. Each sidewall 11, 12 has a curved profile (i.e. the shape of a regular circular segment) in a cross-section perpendicular to the primary axis L. First sidewall 11 has an external radius of curvature R1, while second sidewall 12 has an external radius of curvature R2. Determination of R1 and R2 is illustrated in FIG. 13.

Radius of curvature R1 may be the same or different to the radius of curvature R2. In a preferred embodiment, the external radii of curvature R1, R2 of each of the first and second sidewalls 11, 12 are the same, which simplifies packing of the tubular reactor, and simplifies particle manufacturing. The radius of curvature R1 is typically between 15 and 75 mm. The radius of curvature R2 is typically between 15 and 75 mm.

It has been discovered that improved heat transfer between the tubular reactor and the catalyst particles can be achieved if their relative geometries are optimized. It is desirable that the curvature of the catalyst particles matches the curvature of the tubular reactor along a certain arc length. However, it is not desirable that the curvature of the catalyst particles is exactly the same as the curvature of the tubular reactor.

Therefore, according to this aspect, first and second sidewalls 11, 12 of the catalyst particle 10 each independently have an external radius of curvature R1, R2 in said plane being 0.4-0.99 times the internal radius of curvature R of the tubular reactor.

Additionally, to reduce the occurrence of "bridging" described above, the maximum width D1 of the catalyst particle 10, measured in a plane defined perpendicular to the primary axis L, should be less than 0.25 times the internal diameter D of the tubular reactor 20.

The catalyst particles according to this first aspect have a lenticular cross-sectional form in a direction perpendicular to the primary length axis L, as shown in FIGS. 1-4. The "centres" of each radius of curvature R1, R2 lie outside the form of the catalyst particle 10, as shown in FIG. 13. To ensure the lenticular form, each radius of curvature R1, R2 is smaller than the catalyst particle dimension in a plane perpendicular to the primary length axis L. In other words, 2×R1 is greater than D1; and 2×R2 is greater than D1.

First and second sidewalls 11, 12 can form a sharp boundary along the line where they meet each other. However, such a sharp boundary tends to be a point or line of weakness in the particle, along which it can chip or fracture. Suitably, therefore, the catalyst particle 10 consists of opposing first 11 and second 12 sidewalls extending between the first and second end-faces 18, 19, and opposing third 13 and fourth 14 sidewalls extending between the first and second sidewalls 11, 12 and said first and second end-faces 18, 19.

Each third and fourth sidewall 13, 14 may have a curved profile in a plane defined perpendicular to the primary axis L. Such an arrangement is shown in FIGS. 1-4.

Each of said third and fourth sidewalls 13, 14 independently has a relatively small external radius of curvature R3, R4 being 0.05-0.30 times the internal radius of curvature R of the tubular reactor. Suitably, the external radii of curvature R3, R4 of each of the third and fourth sidewalls 13, 14 are the same. Determination of R3 and R4 is illustrated in FIG. 12.

Alternatively, each of said third and fourth sidewalls 13, 14 independently has an elliptical profile in a cross-section perpendicular to the primary axis L. An elliptical profile changes gradient smoothly along its curvature.

To avoid sharp boundaries, the transition between the first 11, second 12, third 13 and fourth 14 sidewalls is preferably smooth. A "smooth" transition between two surfaces (e.g. sidewalls) is achieved when there are no sudden changes in the orientation of said surfaces. In mathematical terms, this means that the derivative (=gradient) of a first surface is the same as the derivative of a second surface at the point or line where the surfaces meet. Typically, the surfaces of two adjoining sidewalls of a particle described herein are "smooth" in a direction parallel with the primary axis of the particle.

Figure 7:
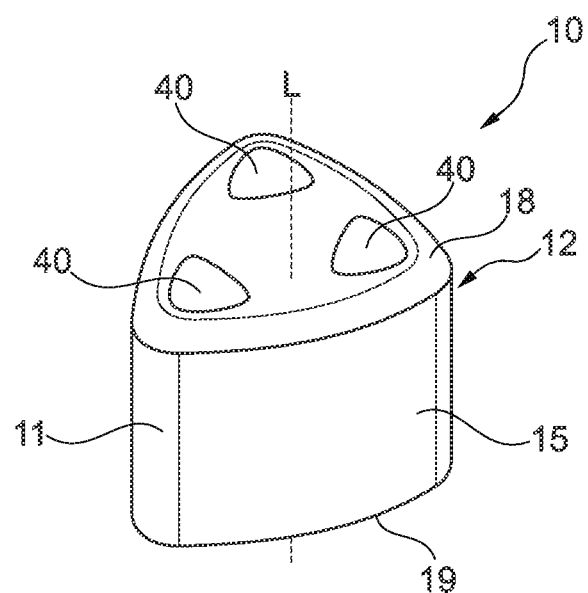
FIG. 7 illustrates the catalyst particle according to a further embodiment of the invention, having a "rounded triangle" cross-section.
Figure 8:
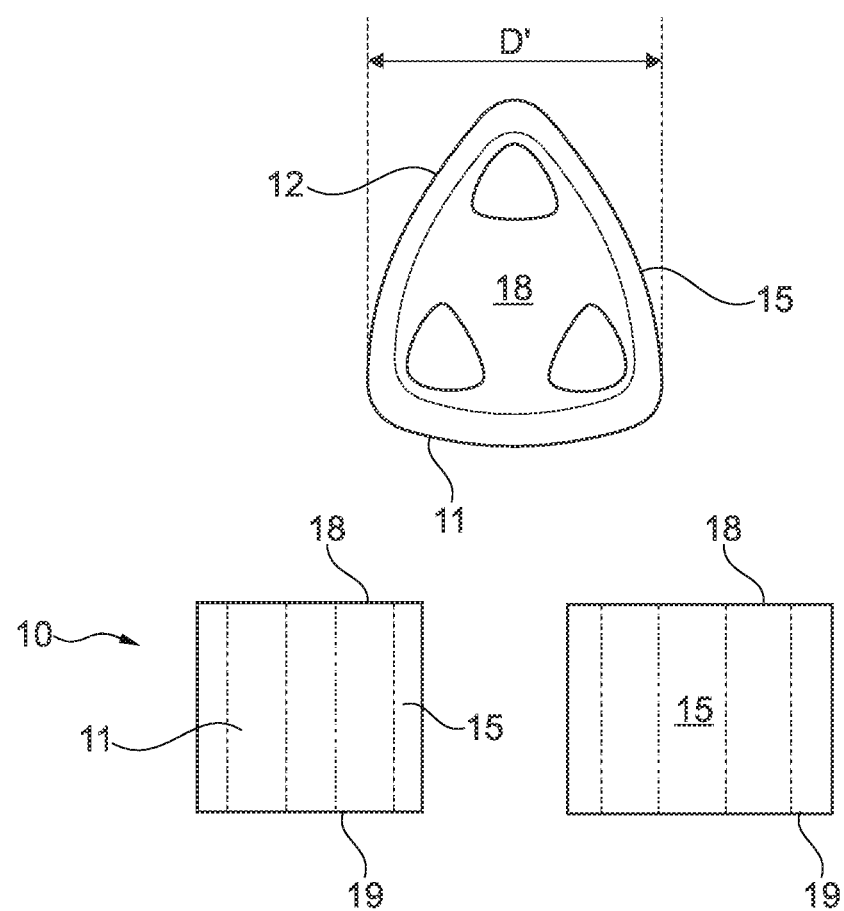
FIG. 8 is a third-angle projection (Multiview) of the particle of FIG. 7.

In a variation of this first aspect, the catalyst particle 10 may have a cross-section in the form of a "rounded triangle" (also known as a Reuleaux triangle). In this aspect, the catalyst particle 10 comprises first 11, second 12 and third 15 sidewalls extending between the first and second end-faces 18, 19. Each of said sidewalls 11, 12, 15 has a curved profile in a cross-section perpendicular to the primary axis L. The first second and third sidewalls 11, 12, 15 each independently have an external radius of curvature R1, R2, R3 in said plane being 0.5-0.99 times the internal radius of curvature R of the tubular reactor 10. Such a catalyst particle is shown in FIGS. 7-8.

Also, according to this aspect, the first 11, second 12 and third 15 sidewalls may meet at a sharp boundary. However it is preferred that the transition between the first 11, second 12 and third 15 sidewalls is smooth.

Also in this "rounded triangle" aspect, at least one of said first end-face 18 and said second end-face 19 may have a convex form so as to define curved first and/or second end-faces 18', 19' of the catalyst particle 10.

In a second aspect of this embodiment, a catalytic system 100 is provided which comprises a tubular reactor 20 as described above, having a cylindrical form about an axis A-A; the internal surface of said tubular reactor having an internal diameter D and an internal radius of curvature R, defined in a plane perpendicular to the axis A-A.

Figure 5:
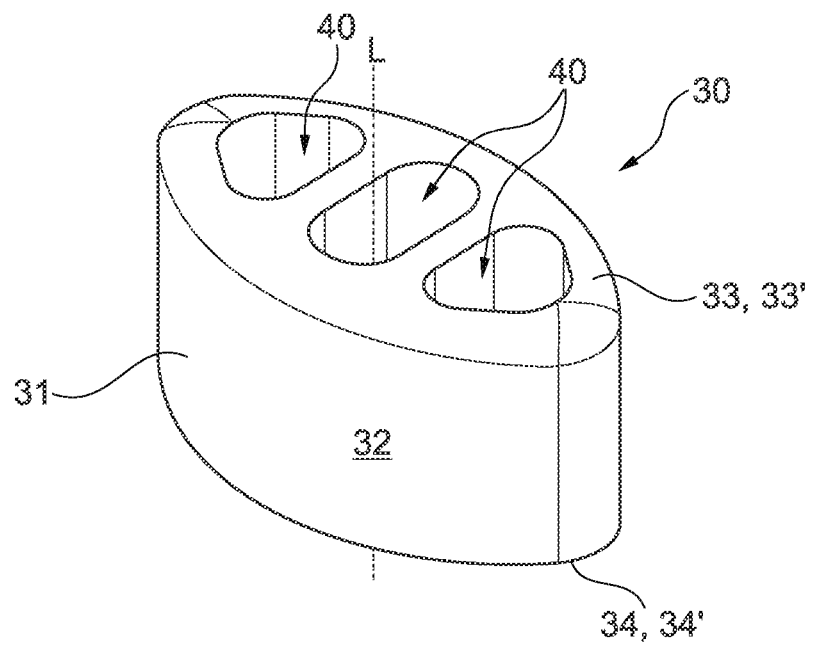
FIG. 5 illustrates a catalyst particle according to a second embodiment of the invention, having an elliptical cross-section and convex end faces.
Figure 6:
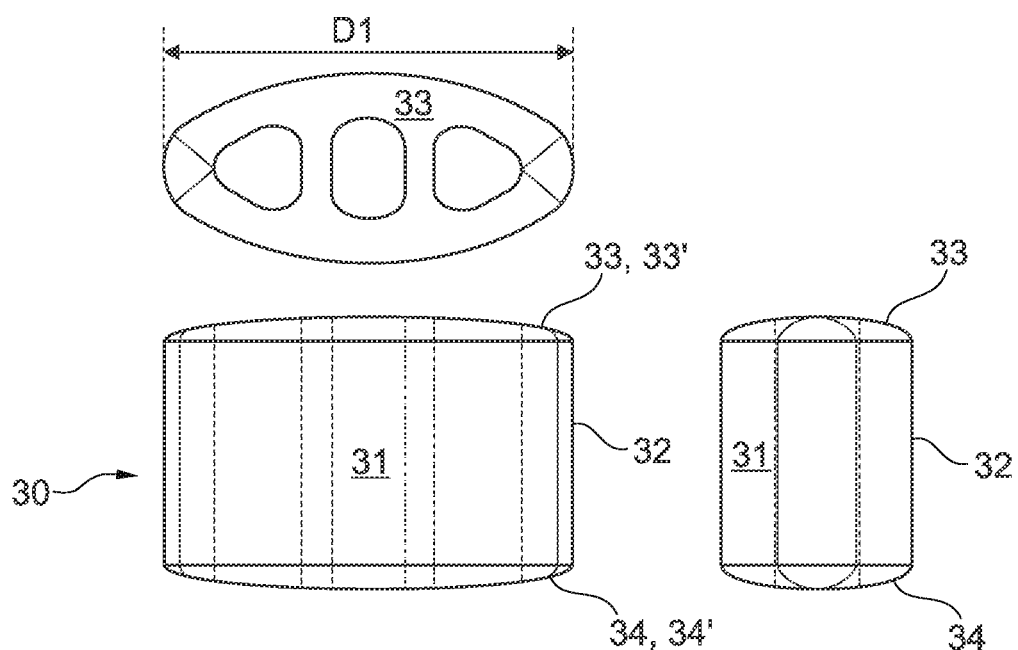
FIG. 6 is a third-angle projection (Multiview) of the particle of FIG. 5, with views of an end-face, first sidewall and third sidewall.

At least one catalyst particle 30 is located in said tubular reactor 20. The catalyst particle of this second aspect is illustrated in FIGS. 5-6. The catalyst particle 30 has a three-dimensional shape comprising a body portion 31. The body portion 31 is in the form of an elliptic cylinder and comprises a sidewall 32 extending parallel to a primary axis L between a first end-face 33 and a second end-face 34. In other words, the body portion 31 is defined at the ends by first and second end-faces 33, 34 and a single sidewall 32 which extends all the way around the body portion 31.

As for the first aspect, the first end-face 33 and the second end-face 34 are arranged perpendicular to said primary axis L at least in the region in which they cross said primary axis L. Accordingly; end-faces 33, 34 may be planar. This embodiment has the advantage that it can be readily manufactured. Alternatively, at least one of said first end-face 33 and said second end-face 34 of said catalyst particle 30, has a convex form so as to define curved first and second end-faces 33', 34' of said catalyst particle 30. The number of flat (planar) surfaces is thus reduced, which—in turn— reduces the potential for adjacent catalyst particles to block gas flow at said flat surfaces.

Preferably, both first end-face 33' and said second end-face 34' have a convex form, as per the embodiment shown in FIGS. 5-6.

This aspect differs from the first aspect above, in that the body portion 31 of the catalyst particle 30 has is in the form of an elliptic cylinder. Using the standard mathematical definition of an ellipse, this means that the curvature changes gradient smoothly along its curvature. The ellipse of said elliptic cylinder has a major axis $2a$ and a minor axis $2b$, and a radius of curvature R5 defined as:

$$R5 = \frac{a^2}{b}$$

In a similar manner to the first aspect, above, improved heat transfer between the tubular reactor and the catalyst particles can be achieved if their relative geometries are optimized. In this aspect, the radius of curvature R5 of the ellipse, as defined above, is 0.8-1.10 times, preferably 0.90-1.05 times, the internal radius of curvature R of the tubular reactor.

Also in this aspect, the maximum width D1 of the catalyst particle 30, measured in a plane perpendicular to said primary axis L, is less than 0.25 times the internal diameter D1 of the tubular reactor 20. Suitably, this maximum width D1 of the catalyst particle 30 is measured in the semi-major axis a of said ellipse, in a plane perpendicular to said primary axis L.

In a similar manner to the first aspect, at least one of said first end-face 33 and said second end-face 34 of the catalyst particle 30, may have a convex form so as to define curved first and second end-faces 33', 34' of said catalyst particle 30.

All other features of the catalytic system, the tubular reactor and the catalyst particles in the second aspect of the invention are the same as those of the first aspect, unless otherwise mentioned.

Catalyst Particles

In a second embodiment, which may be partly included within the first embodiment, the present technology also relates to catalyst particles per se.

In a first aspect of this embodiment, a catalyst particle 10 is provided which has a three-dimensional form with a primary length axis L. With reference to FIGS. 1-4, each catalyst particle 10 has;

a first end-face 18 and a second end-face 19, arranged substantially perpendicular to said primary axis L, opposing first 11 and second 12 sidewalls extending between the first and second end-faces, each sidewall 11, 12 having a curved profile in a plane defined perpendicular to the primary axis L, wherein each of said first and second sidewalls 11, 12 independently has an external radius of curvature R2 in said plane, opposing third 13 and fourth 14 sidewalls extending between the first and second sidewalls 11, 12 and said first and second end-faces 18, 19, each third and fourth sidewall 13, 14 having a curved profile in said plane defined perpendicular to the primary axis L.

Either each of said third and fourth sidewalls 13, 14 independently has an external radius of curvature R3; R4 in said plane, or each third and fourth sidewall 13, 14 having an elliptical profile in said plane defined perpendicular to the primary axis L.

Additionally, the radius of curvature R1, R2 of the first and second sidewalls is greater than the radius of curvature R3, R4 of the third and fourth sidewalls.

Suitably, for the catalyst particle 10 according to this aspect, the radii of curvature R1, R2 of each of the first and second sidewalls 11, 12 are the same. Additionally, the radii of curvature R3, R4 of each of the third and fourth sidewalls 13, 14 may be the same.

As illustrated in FIGS. 3-4, the first end-face 18 and said second end-face 19 may have a convex form so as to define curved first and second end-faces 18', 19' of said catalyst particle 10.

As for the first embodiment (the "system") the transition between the first 11, second 12, third 13 and fourth 14 sidewalls of catalyst particle 10 is preferably smooth.

FIGS. 5-6 illustrate a second aspect of this second embodiment. A catalyst particle 30 is provided having a three-dimensional shape comprising a body portion 31. The body portion 31 is in the form of an elliptic cylinder and comprises a sidewall 32 extending in a direction parallel to a primary axis L between a first end-face 33 and a second end-face 34. At least one (and preferably both) of said first end-face 33 and said second end-face 34 of said catalyst particle 30, has a convex form so as to define curved first and/or curved second end-faces 33', 34' of said catalyst particle 30.

The catalytic particle (10, 30) according to any one of claims 15-20, being a moulded monolithic catalyst particle.

In all embodiments and aspects, the catalytic particle 10, 30 may comprise one or more through-channels 40. Through-channels 40 increase the available surface area of the particle 10, 30, and promote effective gas flow. In the illustrated embodiments, the through channels 40 extend from the first end-face 18, 33 of the catalyst particle 10, 30 to the second end-face 19, 34 of the catalyst particle 10, 30.

Typically, each catalytic particle 10, 30, comprises two or more, such as two, three, four or five through-channels 40. So that gas flow through each through-channel 40 is even, each of said through-channels 40 preferably has essentially the same cross-sectional area. Each through-channel 40 may have a cylindrical form.

The present invention also provides the use of the catalytic particle 10, 30 described herein in a steam methane reformer.

All other features of the catalyst particles in the first and second aspects of the second embodiment of the invention are the same as those of the first embodiment, unless otherwise specified.

EXAMPLE

The influence of the catalyst pellet shape on obtained heat transfer in a tubular reactor was investigated in an experimental set-up, where the catalyst particles were loaded in a reactor tube. The reactor tube had an internal diameter of either 83 mm or 102 mm and was heated by on the outside using condensing steam on the external surface of the reactor tube over the length of the catalyst bed. Low pressure steam having a condensing temperature at around 157° C. was used. Pressurized air is used as feed for the reactor ensuring that catalytic reactions do not take place. Measurements of the temperature increase over the reactor together with the pressure drop over the reactor length are then performed at increasing air flow rates.

Measurements have been made for reference catalyst particles:

Reference #1
  Cylindrical particles
  Ceramic material ($MgAl_2O_4$)
  Particle size 16 mm cylinder particle in height with a height of 11 mm
  7 equal through-holes, one in the center and 6 surrounding the center hole in symmetry with no holes parallel to the symmetry axis of the particles
  As well as these ceramic-based particles, particles made of plastic of identical size and shape are made.

Reference #2
  Cylindrical particles
  Plastic coated material
  Particle size 16 mm cylinder particle in height with a height of 11 mm
  7 equal through-holes, one in the center and 6 surrounding the center hole in symmetry with no holes parallel to the symmetry axis of the particles
  As well as these ceramic-based particles, particles made of plastic of identical size and shape are made.

New Catalyst Particle
  A shape as per FIG. 1
  Radius of the first (R1) and second planes (R2) are 19.85 mm, and where the radius of the third (R3) and fourth planes (R4) are 5.7 mm.
  The particles then become 22.8 mm long (D1) with a distance of 13.8 mm between the first and second plane measured through the center axis perpendicular to the length.
  The particles have 6 holes each of 4.0 mm in diameter.
  The top and bottom end-faces are rounded with a radius of 38.5 mm.

There are made test using pellets both made of plastic (Reference #2) as well as ceramic based particles (Reference #1) of identical size and shape. While plastic pellets are dummies for this type of testing, the ceramic particles are made as carrier materials for catalytic active particles just without the active metal phases added.

Based on the measured data of air flow rate, temperature at the reactor inlet and outlet, pressure drop over the reactor, the length of the catalytic bed and the dimensions of the test unit, the flow rate of the air can be calculated together with the normalized pressure drop (pressure drop per meter of catalyst bed) and the obtained heat transfer given for the internal tube surface area surrounding the catalyst bed. These are given for the three catalyst types in Table 1. Table 1 indicates that the new catalyst shape improves the heat transfer number as function of the relative pressure drop.

TABLE 1

Equilibrium constants and carbon potentials according to cond. III

| Pellet type | Flow rate $Nm^3/h$ | Pressure drop kPa/m | Heat transfer $kJ/m^2/K/h$ |
|---|---|---|---|
| Reference #1 (carrier material) | 59.98 | 4.195 | 20.91 |
|  | 119.94 | 11.687 | 37.19 |
|  | 179.57 | 24.481 | 50.27 |
|  | 239.80 | 39.653 | 62.73 |
|  | 299.79 | 56.193 | 74.33 |
|  | 359.80 | 73.852 | 83.67 |
|  | 419.81 | 91.430 | 92.96 |
|  | 480.17 | 111.362 | 100.70 |
| Reference #2 (plastic coated particles) | 60.01 | 6.582 | 27.78 |
|  | 120.00 | 20.521 | 48.57 |
|  | 180.20 | 42.229 | 65.20 |
|  | 239.99 | 67.879 | 80.57 |
|  | 299.87 | 93.351 | 93.67 |
|  | 360.48 | 120.359 | 105.51 |
|  | 420.99 | 147.010 | 115.71 |
|  | 480.00 | 174.780 | 124.76 |
|  | 420.99 | 147.010 | 115.71 |

TABLE 1-continued

Equilibrium constants and carbon potentials according to cond. III

| Pellet type | Flow rate Nm³/h | Pressure drop kPa/m | Heat transfer kJ/m²/K/h |
|---|---|---|---|
|  | 480.00 | 174.780 | 124.76 |
| New catalyst shape | 59.84 | 6.304 | 29.10 |
|  | 119.91 | 19.765 | 49.91 |
|  | 180.41 | 40.630 | 65.93 |
|  | 239.93 | 64.657 | 81.34 |
|  | 299.06 | 90.178 | 95.85 |
|  | 359.02 | 116.206 | 109.38 |
|  | 420.18 | 143.648 | 121.53 |
|  | 479.77 | 168.544 | 132.79 |

It has been shown from numerous experiments with different cylindrical shaped particles including variations with holes that the obtained heat transfer of these catalysts are almost an identical function of the measured pressure drop, but the heat transfer based on flow rate could be different for the different sizes though also resulting in different pressure drops.

Data gathered for a large number of different catalyst shapes, and with a variety of internal holes (size and numbers) did not provide a significant difference in the heat transfer, and the primary factor observed to affect the heat transfer was the relative curvature.

Although the present invention has been described with reference to a number of figures, embodiments and aspects, the skilled person can combine features from said figures, embodiments and aspects, while remaining within the scope of the appended claims.

The invention claimed is:

1. A catalytic system comprising:
   a. a tubular reactor having a cylindrical form around an axis A-A; the internal surface of said tubular reactor having an internal diameter D and an internal radius of curvature R, defined in a plane perpendicular to the axis A-A;
   b. at least one catalyst particle located in said tubular reactor, wherein the catalyst particle has a three-dimensional form with a primary length axis L, wherein each catalyst particle comprises:
   a first end-face and a second end-face being arranged perpendicular to said primary axis L at least in the region in which they meet said primary axis L, and
   first and second sidewalls extending between the first and second end-faces, each of said sidewalls having a curved profile in a cross-section perpendicular to the primary axis L, wherein said first and second sidewalls each independently have an external radius of curvature R1, R2 in said plane being 0.4-0.99 times the internal radius of curvature R of the tubular reactor,
   and wherein the maximum width D1 of the catalyst particle, measured in a plane defined perpendicular to the primary axis L, is less than 0.25 times the internal diameter D of the tubular reactor,
   and wherein 2×R1 is greater than D1; and 2×R2 is greater than D1.

2. The catalytic system according to claim 1, wherein the external radii of curvature R1, R2 of each of the first and second sidewalls are the same.

3. The catalytic system according to claim 1, wherein said catalyst particle consists of opposing first and second sidewalls extending between the first and second end-faces, and opposing third and fourth sidewalls extending between the first and second sidewalls and said first and second end-faces, each third and fourth sidewall having a curved profile in a plane defined perpendicular to the primary axis L;
   wherein each of said third and fourth sidewalls independently has an external radius of curvature R3, R4 being 0.05-0.30 times the internal radius of curvature R of the tubular reactor, or;
   wherein each of said third and fourth sidewalls independently has an elliptical profile in a cross-section perpendicular to the primary axis L.

4. The catalytic system according to claim 3, wherein the external radii of curvature R3, R4 of each of the third and fourth sidewalls are the same.

5. The catalytic system according to claim 3, wherein the transition between the first, second, third and fourth sidewalls is smooth.

6. The catalytic system according to claim 1, wherein said catalyst particle comprises first, second and third sidewalls extending between the first and second end-faces, each of said sidewalls having a curved profile in a cross-section perpendicular to the primary axis L, wherein said first second and third sidewalls each independently have an external radius of curvature R1, R2, R3 in said plane being 0.5-0.99 times the internal radius of curvature R of the tubular reactor.

7. The catalytic system according to claim 1, wherein at least one of said first end-face and said second end-face of said catalyst particle, has a convex form so as to define curved first and/or second end-faces of said catalyst particle.

8. The catalytic system according to claim 1, wherein the catalyst particle comprises one or more through-channels extending from the first end-face of the catalyst particle to the second end-face of the catalyst particle.

9. The catalytic system according to claim 1, wherein the tubular reactor is a steam methane reformer.

10. A catalytic system comprising:
    a. a tubular reactor having a cylindrical form around an axis A-A; the internal surface of said tubular reactor having an internal diameter D and an internal radius of curvature R, defined in a plane perpendicular to the axis A-A;
    b. at least one catalyst particle located in said tubular reactor,
    wherein the catalyst particle has a three-dimensional shape comprising a body portion; said body portion being in the form of an elliptic cylinder and comprising a sidewall extending parallel to a primary axis L between a first end-face and a second end-face; wherein the first end-face and the second end-face are arranged perpendicular to said primary axis L at least in the region in which they cross said primary axis L; and
    wherein the ellipse of said elliptic cylinder has a major axis 2a and a minor axis 2b, and a radius of curvature R5 defined as:

$$R5 = \frac{a^2}{b}$$

being 0.9-1.10 times the internal radius of curvature R of the tubular reactor,
    and wherein the maximum width D1 of the catalyst particle, measured in a plane perpendicular to said primary axis L, is less than 0.25 times the diameter D of the tubular reactor.

11. The catalytic system according to claim 8, wherein the maximum width D1 of the catalyst particle, measured in the semi-major axis a of said ellipse, in a plane perpendicular to said primary axis L, is less than 0.25 times the diameter D of the tubular reactor.

12. The catalytic system according to claim 10, wherein at least one of said first end-face and said second end-face of said catalyst particle, has a convex form so as to define curved first and second end-faces of said catalyst particle.

13. The catalytic system according to claim 12, wherein the catalyst particle comprises two or more through-channels, each of said through-channels having essentially the same cross-sectional area.

* * * * *